United States Patent
DiFonzo

(10) Patent No.: US 9,869,567 B2
(45) Date of Patent: Jan. 16, 2018

(54) PORTABLE COMPUTER SLEEP MODE SYSTEM SENSORS

(71) Applicant: Apple Inc., Cupertino, CA (US)

(72) Inventor: John C. DiFonzo, Emerald Hills, CA (US)

(73) Assignee: Apple Inc., Cupertino, CA (US)

( * ) Notice: Subject to any disclaimer, the term of this patent is extended or adjusted under 35 U.S.C. 154(b) by 133 days.

(21) Appl. No.: 14/862,100

(22) Filed: Sep. 22, 2015

(65) Prior Publication Data

US 2017/0083071 A1     Mar. 23, 2017

(51) Int. Cl.
| | | |
|---|---|---|
| *G06F 1/32* | (2006.01) | |
| *G01D 5/34* | (2006.01) | |
| *G01D 5/347* | (2006.01) | |
| *G06F 1/16* | (2006.01) | |

(52) U.S. Cl.
CPC ......... *G01D 5/345* (2013.01); *G01D 5/34792* (2013.01); *G06F 1/1677* (2013.01); *G06F 1/1681* (2013.01); *G06F 1/3218* (2013.01); *G06F 1/3231* (2013.01); *G06F 1/3265* (2013.01); *G06F 1/3287* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | |
|---|---|---|---|
| 7,428,142 B1 * | 9/2008 | Ligtenberg ............ | G06F 1/1616 345/157 |
| 7,707,436 B2 * | 4/2010 | Tsukamoto ........... | G06F 1/1616 713/300 |
| 7,945,794 B2 * | 5/2011 | Chen ..................... | G06F 1/1616 713/300 |
| 8,203,833 B2 | 6/2012 | Huang et al. | |
| 8,677,568 B2 | 3/2014 | Sutterlutti | |
| 8,844,151 B2 | 9/2014 | Ferrari et al. | |
| 2006/0168442 A1 * | 7/2006 | Khanna ................ | G06F 9/4411 713/2 |
| 2011/0055608 A1 * | 3/2011 | Jin ........................ | G06F 1/1616 713/323 |
| 2011/0276793 A1 * | 11/2011 | Pulla .................... | G06F 9/4401 713/1 |
| 2012/0019492 A1 * | 1/2012 | Barnhoefer ........ | H05B 33/0851 345/207 |
| 2012/0026681 A1 | 2/2012 | Wang et al. | |
| 2013/0100160 A1 * | 4/2013 | Chang ................... | G06F 3/042 345/619 |
| 2015/0020034 A1 | 1/2015 | Okuley | |
| 2015/0324008 A1 * | 11/2015 | Yeo ......................... | G06F 1/16 345/170 |

* cited by examiner

*Primary Examiner* — Zahid Choudhury
(74) *Attorney, Agent, or Firm* — Downey Brand LLP

(57) ABSTRACT

A sleep mode system for an electronic device can include a light source, a sensor, and a light altering component. The light altering component can rotate with one device component, such as a laptop lid, while the light source and/or sensor remain stationary with another device component, such as a laptop base. A controller can determine the orientation angle of the light altering component based on the detected light, and can put the device into or remove the device from a sleep mode based on the angle, which can reflect an open state or closed state for the electronic device.

20 Claims, 10 Drawing Sheets

SECTION A-A

SECTION A-A

| [0,0,0,0,0,0,0,0] | 0° - 1.41° |
| [0,0,0,0,0,0,0,1] | 1.41° - 2.81° |
| [0,0,0,0,0,0,1,0] | 2.81° - 4.22° |
| [0,0,0,0,0,0,1,1] | 4.22° - 5.63° |
| [0,0,0,0,0,1,0,0] | 5.63° - 7.03° |
| [0,0,0,0,0,1,0,1] | 7.03° - 8.44° |

| [1,1,1,1,1,1,0,1] | 355.78° - 357.19° |
| [1,1,1,1,1,1,1,0] | 357.19° - 359.59° |
| [1,1,1,1,1,1,1,1] | 358.59° - 360° |

PORTABLE COMPUTER SLEEP MODE SYSTEM SENSORS

FIELD

The described embodiments relate generally to electronic devices. More particularly, the described embodiments relate to sleep mode systems for electronic devices.

BACKGROUND

Sleep mode systems allow electronic devices to enter a state of low energy use, such as where battery conservation is preferable without deleting cache or ending running program states, for example. In the specific case of laptop computers and other clamshell type electronic devices, a resident sleep mode system can detect whether the computing device is closed and put the device into sleep mode automatically. While sleep mode systems for electronic devices have worked well in the past, there can be room for improvement.

SUMMARY

Representative embodiments set forth herein disclose various structures, methods, and features thereof for the disclosed portable computer sleep mode systems. In particular, the disclosed embodiments set forth electronic devices having a sleep mode that is more accurate and less foolproof than existing sleep mode systems.

According to various embodiments, a sleep mode system is configured for putting an electronic device into a sleep mode when a closed device configuration is detected. The sleep mode system can include: 1) a light source component; 2) a sensing component; and 3) a light altering component. The sensing component can detect light emitted from the light source component, with the light varying according to a variable rotation of the light altering component. A controller in communication with the sensing component can determine an orientation angle of the light altering component based upon the detected light.

In some embodiments, an electronic device can employ the sleep mode system to enter a sleep mode when the device is in a closed state and to wake from the sleep mode when the device is in an open state. The electronic device can be a laptop computer, where the light altering component can be arranged to rotate with the upper portion while the sensing component or light source remains stationary with the base portion. The orientation angle of the light altering component with respect to the stationary component can then match or correspond to the orientation angle of the upper portion with respect to the base portion of the laptop.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and methods for the disclosed portable computer sleep mode systems. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Sleep mode systems are a common tool to conserve battery in a computing device without completely ending or deleting programs and temporary memories in the device. Many current sleep mode systems for electronic devices can be inaccurate or improperly triggered, however, such as where an outside magnet near the electronic device is detected by an internal sleep mode system using a Hall Effect sensor. It may thus be useful to provide improved computer sleep mode systems that are more accurate and less foolproof than existing systems.

The embodiments set forth herein thus provide various structures and methods for providing portable computer sleep mode systems having light sources, light sensors, and light altering components that rotate through a range of motion and affect light before it reaches the light sensors. An associated controller or processor can determine an orientation angle of a light altering component based on the light detected. The controller or processor can put the electronic device into or out of a sleep mode depending upon the orientation angle, which can indicate whether the electronic device is open or closed. In the case of a laptop computer, a light altering component can rotate with the upper component while a light source component or light sensing component can stay with the base component and not rotate.

The foregoing approaches provide various structures and methods for the disclosed portable computer sleep mode systems. A more detailed discussion of these structures, methods, and features thereof is set forth below and described in conjunction with FIGS. 1-10, which illustrate detailed diagrams of devices and components that can be used to implement these structures, methods, and features.

Figure 1A:
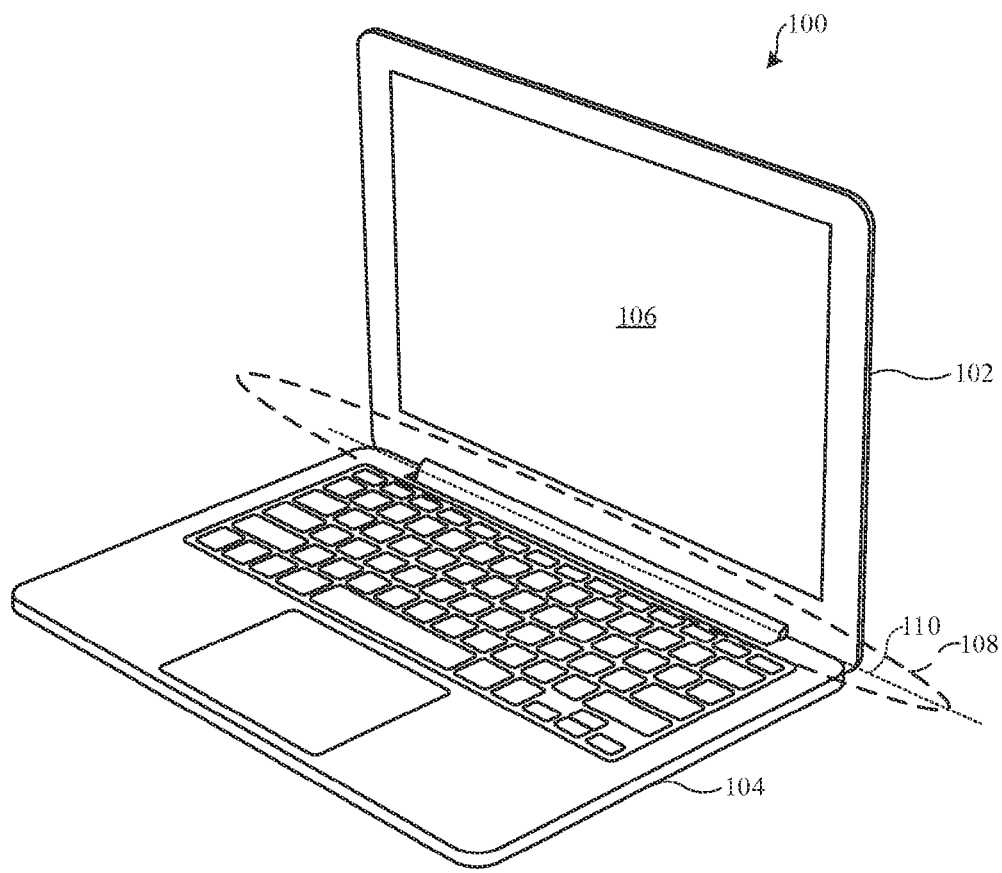
FIG. 1A illustrates in front perspective view an exemplary electronic device in an open state according to various embodiments of the present disclosure.

Turning first to FIG. 1A, an exemplary electronic device in an open state according to various embodiments of the present disclosure is illustrated in front perspective view. Open state electronic device 100 can take the form of a laptop computer, which can include a lid or upper component 102 and a bottom or base component 104. Upper component 102 can house a display 106, electronics for controlling display 106, and other electrical elements. Base component 104 can house a keypad, trackpad, processor, memory, integrated circuits, a battery, and other electrical elements suitable for operating computing device 100. Upper component 102 can be pivotally or rotationally coupled to base component 104 by a hinge assembly or other similar item located at a hinge region 108 of upper component 102 and base component 104. The hinge assembly, which can also be referred to as a clutch barrel, allows upper component 102 to rotate with respect to base component 104 about a rotational axis 110.

The open state of electronic device 100 as shown in FIG. 1A can represent a state for which a sleep mode is not activated based upon the relative orientation of upper component 102 with respect to base component 104. In various embodiments, electronic device 100 entering such an open state from a closed state can be a situation where a sleep mode is exited, which can also be referred to as a wake mode. An "open state" for electronic device 100 can be defined as a state where the electronic device 100 is not closed. This can be for example, an arrangement where the relative orientation of upper component 102 with respect to base component 104 is at a non-zero orientation angle. While this angle is about 90 degrees for the electronic device 100 as shown in FIG. 1A, such a non-zero angle representing an "open state" for electronic device 100 can be anything between about 2 and 150 degrees, for example.

Figure 1B:
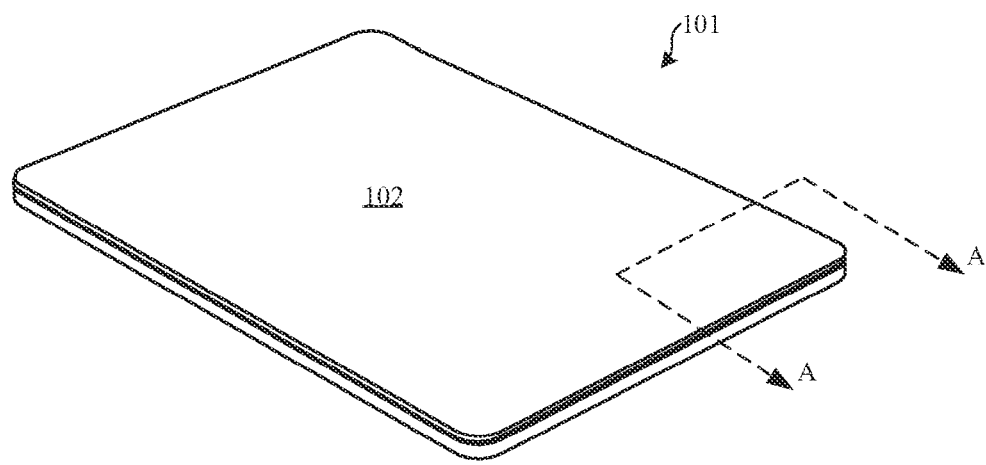
FIG. 1B illustrates in front perspective view the exemplary electronic device of FIG. 1A in a closed state according to various embodiments of the present disclosure.

Continuing with FIG. 1B, the exemplary electronic device of FIG. 1A is illustrated in front perspective view in a closed state or arrangement. Closed state 101 can involve the lid or upper component 102 being shut atop the base component 104, such that the orientation angle between upper component 102 and base component 104 is about zero degrees. Closed state 101 can represent a state or arrangement for which a sleep mode is activated for the electronic device. Where the electronic device 100 enters closed state 101 from an open state, the electronic device can be put into a sleep mode, which can persist while closed state 101 remains. Upon electronic device 100 entering an open state from closed state 101, the sleep mode can end. This can also be termed as entering a wake mode, which can persist until closed state 101 reoccurs. One or more sensors or other components may be located at or within the electronic device 100 to detect when the electronic device is in an open state or closed state 101. Such sensors or other components might be located at or about hinge region 108, such as around section A-A, as shown in greater detail in FIGS. 2-3 below.

Although the above examples have been illustrated with respect to a laptop computer, it will be understood that similar arrangements and concepts may also apply to other types of electronic devices. For example, clamshell type smart phones and hinged supports or other parts of electronic devices can operate similarly, and may also benefit from the various further items, methods, and concepts disclosed herein. As another non-limiting example, clamshell type smart phones or other portable electronic devices may also employ the sleep mode systems as set forth herein, such that these systems are limited for use with laptop computers only.

Figure 2:
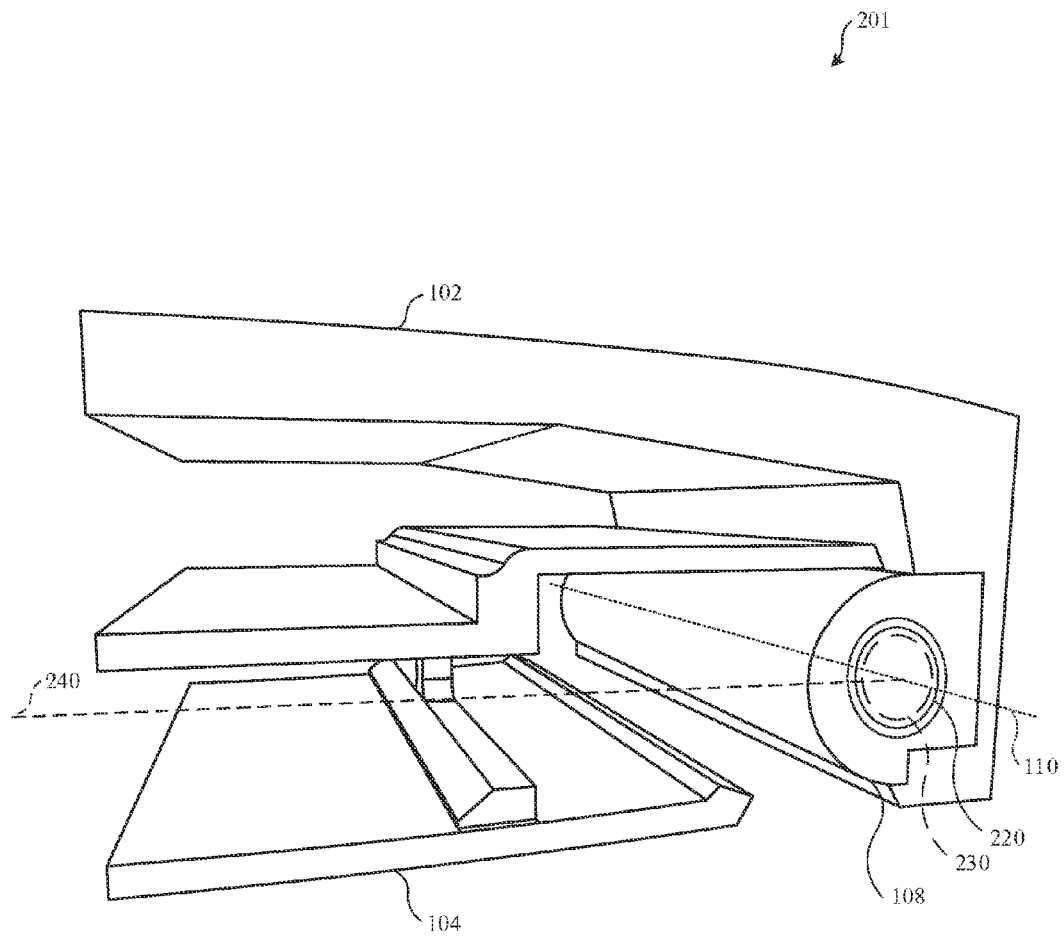
FIG. 2 illustrates in side perspective and partial cross-section view an exemplary sleep mode system region within the electronic device of FIG. 1B in a closed state along section A-A of FIG. 1B according to various embodiments of the present disclosure.

FIG. 2 illustrates in side perspective and partial cross-section view an exemplary sleep mode system region within the electronic device of FIG. 1B in a closed state along section A-A of FIG. 1B according to various embodiments of the present disclosure. Closed state electronic device 201 can include an upper component 102, a base component 104, and a hinge region 108 having a rotational axis 110, such as those set forth in above examples. Closed state electronic device 201 can also include one or more optical components disposed within and/or proximate the hinge region 108. Such optical components can include at least one rotating component 220 that rotates with a rotating portion of the hinge, and at least one non-rotating component 230 that does not rotate with any rotation of the hinge. In various embodiments, the rotating portion of the hinge can rotate with upper component 102 as the upper component pivotally rotates with respect to the base component 104, which does not rotate. Accordingly, rotating component(s) 220 can rotate with the upper component 102, while the non-rotating component(s) 230 do not rotate with the upper component 102. This can mean that the non-rotating component(s) 230 remain non-rotational in correspondence with a non-rotating base component 104 during a rotational operation of the hinge.

As shown in FIG. 2, rotating component(s) 220 can define a vector, shown as closed state vector 240. Closed state vector 240 can be a fixed zero or baseline vector, or can have a small amount of displacement or variance that can still be considered closed state, such as, for example, 0 to 2 degrees. Various different rotational orientations of the rotating component(s) 220 can be detected by one or more sensors, which may be part of the non-rotating component(s) 230, as set forth in greater detail below. In some embodiments, it can be advantageous to dispose a rotating component 220, a non-rotating component 230, or both within hinge region 108 in such a manner that the rotating component 220 rotates with the upper component 102 while also remaining close to the non-rotating component 230.

Figure 3:
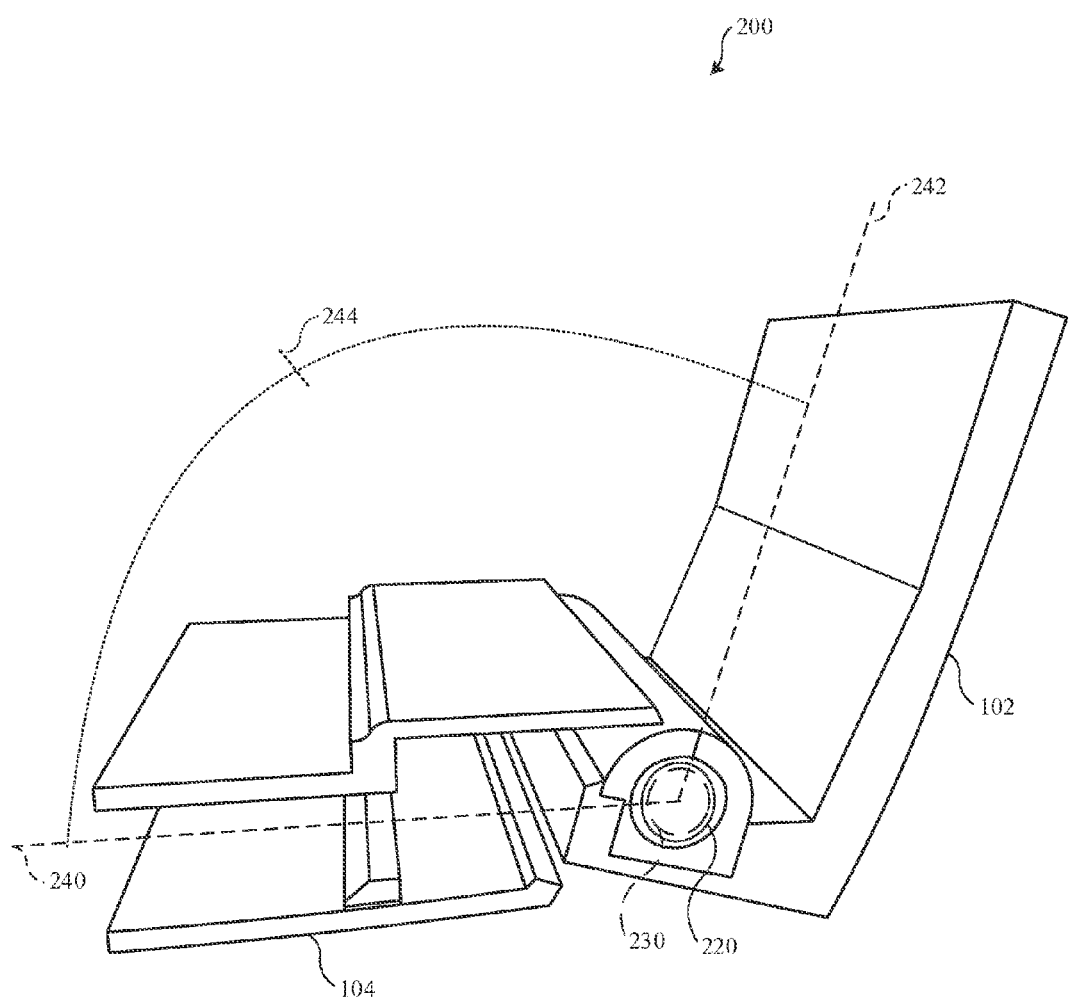
FIG. 3 illustrates in side perspective and partial cross-section view the exemplary sleep mode system region of FIG. 2 with its electronic device in an open state according to various embodiments of the present disclosure.

FIG. 3 illustrates in side perspective and partial cross-section view the exemplary sleep mode system region of FIG. 2 with its electronic device in an open state according to various embodiments of the present disclosure. Open state electronic device 200 is the same electronic device as closed state electronic device 201 shown in FIG. 2, albeit with upper component 102 opened at an angle 244 with respect to base component 104. As shown in FIG. 3, angle 244 is about 110 degrees, although it will again be understood that any angle in a range of about 2 degrees through about 150 degrees can be considered an "open state" for electronic device 200. Of course, alternative angles other than 2 degrees can also be used as the initial angle to transition from closed state to open state for the electronic device, such as, for example, 0, 1, 3, or 5 degrees, among others. As also shown in FIG. 3, the rotating component 220 and non-rotating component 230 can remain in the same location as in FIG. 2. The non-rotating component 230 has not rotated, while the rotating component 220 has rotated equally with or corresponding to the rotation of upper component 102. Accordingly, the vector for rotating component 220 has also rotated, from closed state vector 240 to variable open state vector 242.

In various embodiments, such as in the specific examples set forth below, the rotating component 220 and non-rotating component 230 can be included within an optical arrangement that includes a light source, light sensor, and/or light altering component. For example, one or both of a light source and light sensor can be a non-rotating component 230, while a light altering component can be a rotating component 230. The angular orientation of the light altering component can affect how the light from the light source is altered, such that the light sensor(s) detect light differently for different angular orientations of the light altering component. Properties of the altered light as detected or sensed can then be communicated to a processing component located at the sensor or elsewhere on the electronic device. The detected light properties can then be used to determine an angle of orientation for the light altering component, such as angle 244 above. Again, this angular orientation determination can match or correspond to the angular orientation of an upper component 102 with respect to a base component 104 of an overall electronic device 100. This determination can be used to determine an open or closed state for the electronic device, which can in turn be used to decide whether to put the device into or out of a sleep mode.

In various embodiments, the angular orientation determination can be used for other purposes beyond whether to put the device into or out of a sleep mode. For example, an antenna performance and/or a thermal performance of the device can be affected by the angular position of one device component with respect to another device component, such as a device display with respect to a device base. An overall system within the electronic device can use the angular orientation determination then to change an operation of the device, such as to improve performance or to conserve energy. For example, a boost of an antenna function for a WiFi or other wireless signal may be appropriate for some angular orientations, while a reduction of the antenna function may be appropriate for other angular orientations. As another example, a fan operation or other thermal performance operation might be triggered in the direction of a boost or a reduction due to the angular orientation determination, such as where certain angles are more prone to greater heat generation within a portion of the device.

Figure 4:
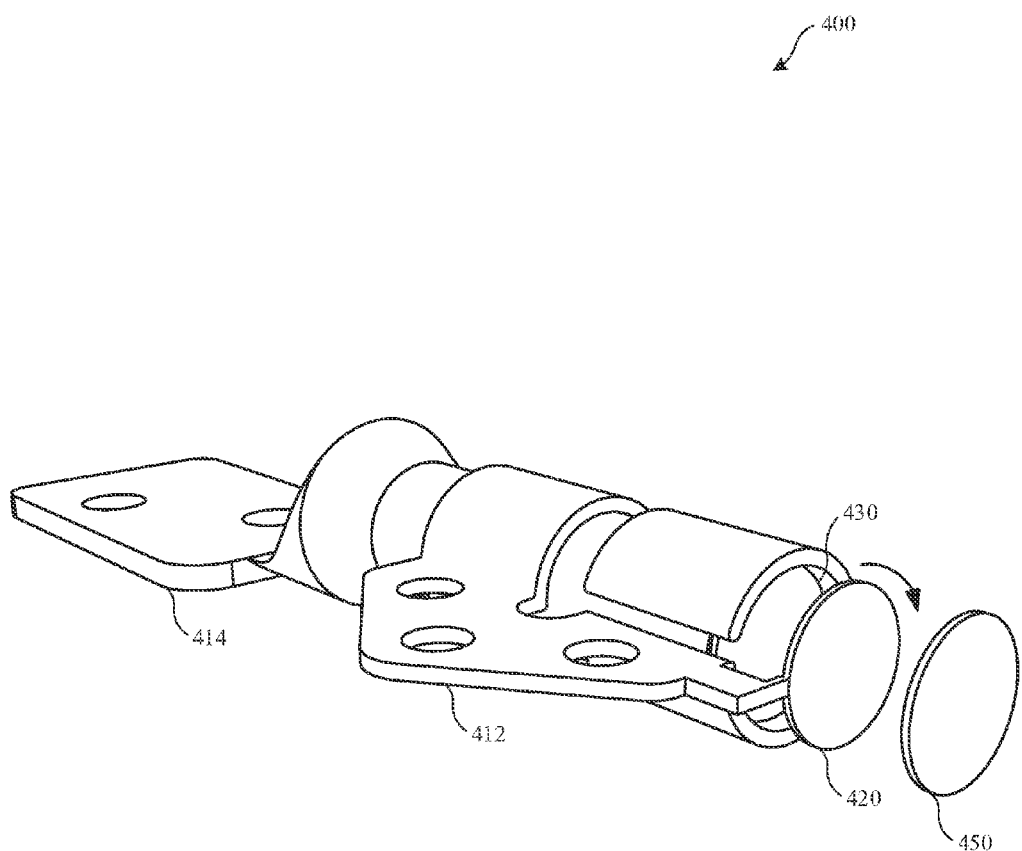
FIG. 4 illustrates in exploded side perspective view an exemplary hinge section for an electronic device having an optical arrangement for a sleep mode system according to various embodiments of the present disclosure.

FIG. 4 illustrates in exploded side perspective view an exemplary hinge section for an electronic device having an optical arrangement for a sleep mode system according to various embodiments of the present disclosure. Hinge section 400 can include a first bracket 412 and a second bracket 414, each of which can couple to different electronic device components. For example, first bracket 412 might couple to a laptop upper component or lid (not shown), while second bracket 414 might couple to a laptop base component (not shown). Accordingly, the first bracket 412 can be pivotally coupled to the second bracket. Hinge section 400 can also include an optical arrangement with one or more light altering components 420, one or more light source components or light sources 430, and one or more light sensing components or sensors 450. As shown, the light altering component 420 can be adapted to rotate with the first bracket 412, which can be coupled to a laptop upper component. Light source(s) 430 and sensor(s) 450 can be non-rotating with respect to a rotation of the first bracket 412.

Light emitted from the light source(s) 430 can pass through or otherwise be affected or altered by light altering component 420 before being detected by sensor(s) 450. The rotational orientation of the light altering component 420 can affect how the altered light is detected by sensor(s) 450. Different types of light sources 430, light altering components 420, and/or sensors 450 can be used, as set forth in some of the illustrative examples below. Furthermore, it will be readily appreciated that some arrangements may allow for the rotation of a light source 430 and/or sensor 450 while the light altering component 420 remains non-rotational, with the same results being achievable.

As noted above, the rotation of rotating component 220 (e.g., light altering component 420) can match the rotation of the upper component 102 of an electronic device 100, such that the angle between closed state vector 240 and variable open state vector 242 matches the angle between upper component 102 and base component 104. In various alternative embodiments, the rotation of rotating component 220 (e.g., light altering component 420) may only correspond to the rotation of upper component 102, such as by a factor of 2 or ½, or by an offset amount where one or the other rotates some amount without any rotation of the other. Any and all such factors and offsets can be accounted for in the process of determining the orientation angle of the upper component 102 with respect to the lower component 104, as will be readily appreciated.

In various embodiments, a given sleep mode system comprising a rotating light altering component 420, light source(s) 430, sensor(s) 450, and one or more associated controllers or processing components may be installed and set to operate within a given electronic device with reasonable expectations of reliance given the actual components being used. The one or more light sensing components or sensors 450 can be configured to detect light that has been altered by the light altering component 420, and can be further configured to provide a signal regarding the detected light. The controller or processor can be configured to receive the signal, which it can then use to determine an angle of orientation. In some embodiments, further steps or conditions may be applied, such as to zero or calibrate these components, or even to take actual measurements and provide the processing components with actual values for the properties detected at different critical angles. In this manner, variances in the structural makeup of components and their relative locations can be accounted for from device to device.

For example, a given electronic device 100 can be provided with a testing or calibration process for its rotating component 220, sensor(s), and/or other items, such as those set forth in the detailed examples below, and after these items have been installed into the device. One reading at can be taken when the given electronic device 100 is known to be fully closed, with the properties detected at this time then being recorded at a memory or other local storage. Another reading can be taken when the given electronic device is slightly opened to some minimum threshold level, such as about 2 degrees, with the properties detected again being recorded. Further readings can be taken as may be desired for one or more additional angles. These recorded values can then be used later during ordinary device operations to assist with determining the actual orientation angle, or just generally whether an open state or closed state exists for the device. Various detailed examples will now be provided.

Figure 5:
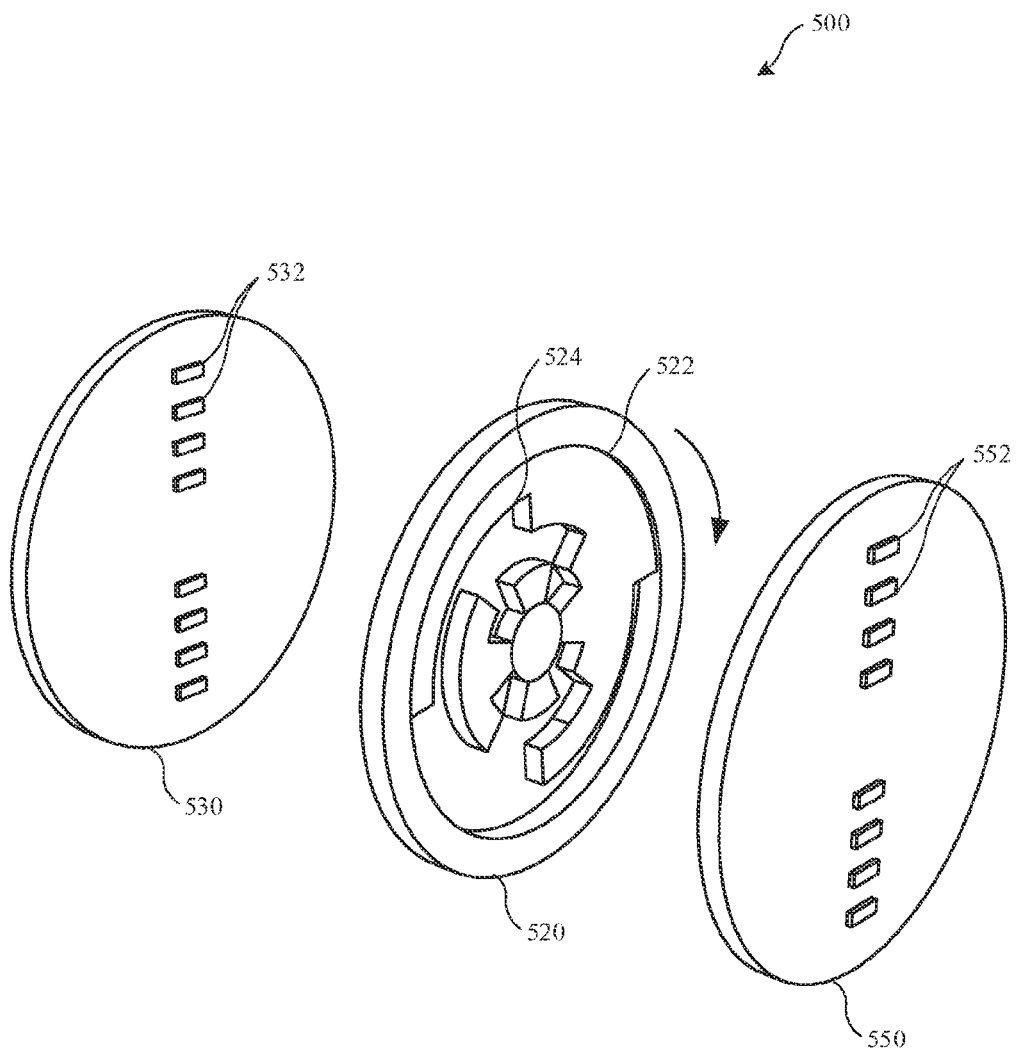
FIG. 5 illustrates in exploded side perspective view an exemplary optical arrangement for a sleep mode system according to various embodiments of the present disclosure.

Turning next to FIG. 5, an exemplary optical arrangement for a sleep mode system according to various embodiments of the present disclosure is illustrated in exploded side perspective view. Optical arrangement 500 merely provides specific examples for a possible light altering component 420, light sources 430, and sensors 450 described in the exemplary arrangement above. In the specific example of optical arrangement 500, an encoder disk 520 can be a rotating light altering component, while light source component 530 and light sensing component 550 do not rotate. Light source component 530 can include a plurality of light sources 532, which can be eight light emitting diodes (LEDs), for example. Light sensing component 550 can include a corresponding plurality of light sensors 552, which can be eight photo-sensors, for example. Each of light source component 530 and light sensing component 550 can include a printed circuit board (PCB) and other components to facilitate the ability to provide and sense light as needed.

Each of individual light sources 532 can correspond to an individual light sensor 552, and signals for each light sensor can indicate whether light is sensed or not. As encoder disk 520 rotates, various slots or openings and opaque portions are rotated, such that light is alternatively let through or blocked for a given light source 532 to light sensor 552 pairing, depending upon the variable angular orientation of the encoder disk 520. At different angles, a different combination of "on" or "off" values can be detected across the eight separate light-sensor pairs.

Figure 6A:
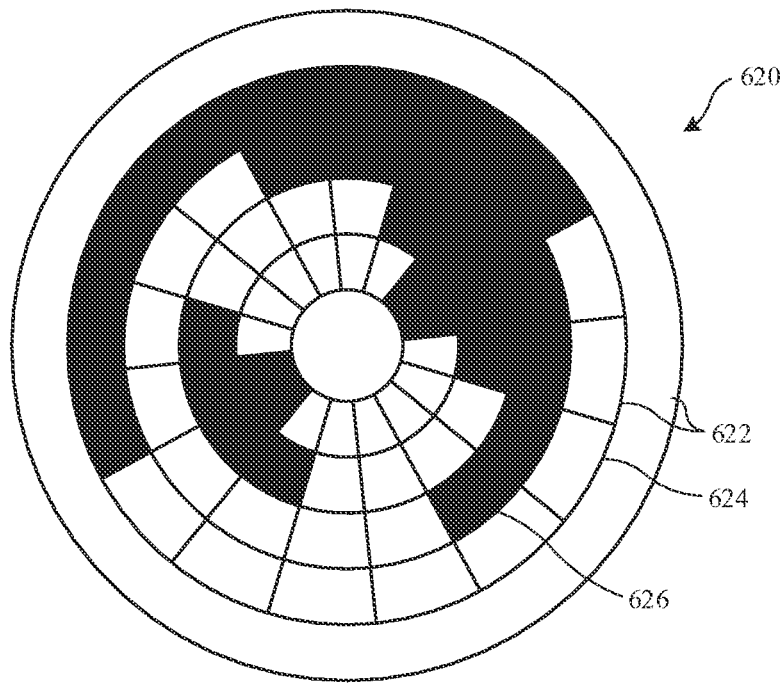
FIG. 6A illustrates in front plan view an exemplary encoder disk for the optical arrangement of FIG. 5 according to various embodiments of the present disclosure.

FIG. 6A illustrates in front plan view an exemplary encoder disk for the optical arrangement of FIG. 5 according to various embodiments of the present disclosure. Encoder disk 620 can include a plurality of tracks 622 arranged in concentric circles, with each track being dedicated to one light-sensor pair. Various areas of each track can include opaque portions 624, which block light, and slots or openings 626, which allow light to pass therethrough. The slots or openings 626 can alternatively be transparent portions, as may be desired. When used as a whole, encoder disk 620 can have a plurality of slots or openings 626 that together form a binary code generator. Although details for only 4 tracks 622 having opaque portions 624 and openings 626 are shown in FIG. 4A for purposes of illustration, it will be readily appreciated that 8 tracks can be used for an encoder disk 620, such that 8 "bits" of "on-off" information can be provided by allowing light to pass through or be blocked at different angular orientations of encoder disk 620. Of course, more or fewer tracks can be used, along with a corresponding number of fewer or more light-sensor pairs, such as where greater or less accuracy is desired for determining the angular orientation of encoder disk 620.

Figure 6B:
FIG. 6B illustrates a table of orientation angles and binary codes for the exemplary encoder disk of FIG. 6A according to various embodiments of the present disclosure.

FIG. 6B illustrates a table of orientation angles and binary codes for the exemplary encoder disk of FIG. 6A. In general, different rotational positions of the encoder disk result in different binary code readings at the light sensing component. Table 660 represents the starting and ending binary codes for all 256 possible arrangements (i.e., $2^8$) for the 8 light-sensor pairs shown, along with corresponding angle ranges over a range of 360 degrees. Of course, many electronic devices do not necessarily require a full 360 degree range of rotation, such that the angle ranges in table 660 can be even smaller for smaller rages or rotation. For example, a typical laptop computer lid and base can have a relative range of rotation of about 150 degrees or less. Typically this relative range of rotation can be about 135 degrees. In such instances, the corresponding angle ranges for an 8-bit encoder disk and light-sensor arrangement could be less than one degree each, as opposed to the 1.4 degree range shown in table 660. As such, the optical arrangement 500 provided herein could be arranged to determine the angular orientation of encoder disk 520 to within less than one degree in various embodiments. Again, the detailed optical arrangement 500 provides only one specific example of how an optical arrangement can be used as part of a sleep mode system. Other detailed optical arrangements are also possible, such as the following alternative example.

Figure 7:
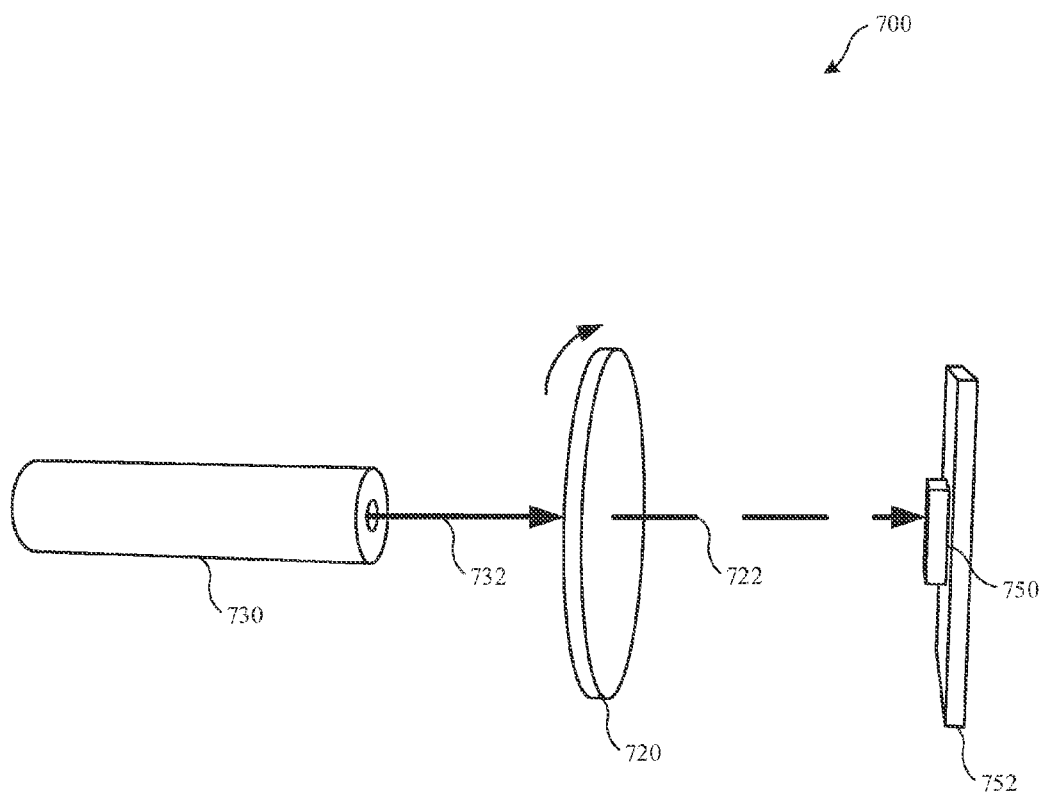
FIG. 7 illustrates in exploded side perspective view an exemplary alternative optical arrangement for a sleep mode system according to various embodiments of the present disclosure.

Turning next to FIG. 7 an alternative exemplary optical arrangement for a sleep mode system is depicted in exploded side perspective view. Optical arrangement 700 provides other specific examples for a possible light altering component 420, light source 430, and sensor 450 set forth in general above. In the specific example of optical arrangement 700, a polarizer 720 can be a rotating light altering component, while polarized light source 730 and photo-sensor 750 on PCB 752 do not rotate. Polarized light laser 730 can be, for example, a typical vertical-cavity surface-emitting laser (VCSEL). As such, a beam of polarized light 732 emitted from a VCSEL or other polarized light laser 730 is altered by polarizer 720 depending upon the rotational orientation of the polarizer 720. Altered light 722 then continues through and can be detected at photo-sensor 750.

As will be readily appreciated, the altered light 722 detected at photo-sensor 750 will vary according to the variable rotational orientation of the polarizer 720. As the angle of orientation of the polarizer 720 changes, the strength of the light detected will change as well, the gradually changing curve of which can be plotted to resemble a full wave cycle between 0 (no light) and 1 (full light) over a full 360 degree range of rotation for the polarizer 720. Drawbacks to using a single VCSEL and polarizer include the tendency toward low angle sensitivity at the point of greatest signal (i.e., full light), as well as multiple instances at the same light intensity for different angular orientations (e.g., ½ signal strength at angles that are 90 degrees apart). These drawbacks can be easily overcome by using multiple polarizers and sensors. For example, a single VCSEL can be split (or two VCSELs can be used) to deliver two polarized light beams 732 to two differently oriented polarizers 720, with light passing therefrom being sensed by two different photo-sensors 750.

Figure 8A:
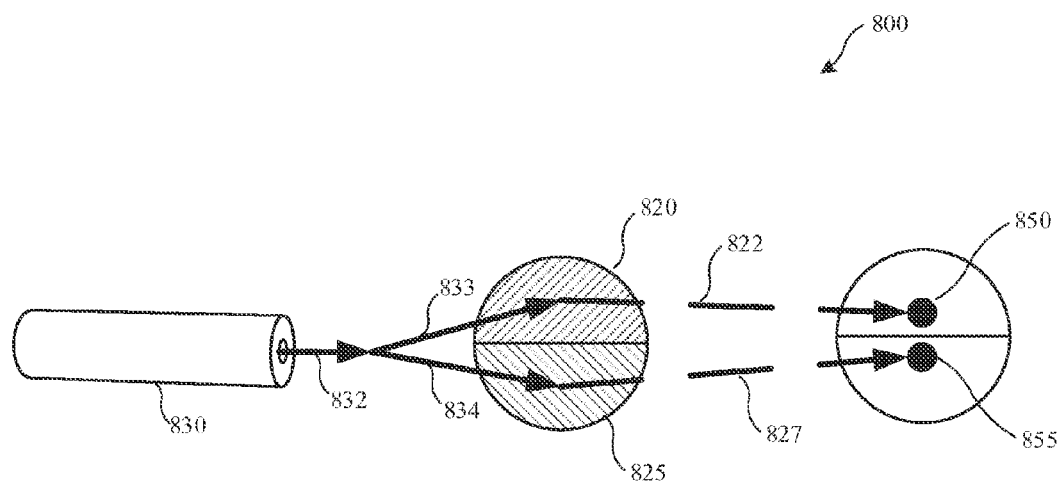
FIG. 8A illustrates in front plan view an exemplary multiple polarizer disk and photocell arrangement for the optical arrangement of FIG. 7 according to various embodiments of the present disclosure.

FIG. 8A illustrates in front plan view an exemplary multiple polarizer disk and photocell arrangement for the optical arrangement of FIG. 7 according to various embodiments of the present disclosure. Optical arrangement 800 can include a single VCSEL or other polarized light source 830, multiple rotatable polarizers 820, 825, and corresponding multiple photocells 850, 855. As in the foregoing example, the light source 830 and photocells 850, 855 preferably do not rotate, while the polarizers 820, 825 do rotate. Polarized light source 830 emits a beam of polarized light 832 that can be split into two polarized light beams 833,

834, each of which are delivered to a separate polarizer 820, 825. The angular orientations of polarizers 820, 825 can be offset by a fixed angular amount, such as, for example, 25 degrees. Of course, other offset angular amounts could also be used. Altered light beams 822, 827 then continue from polarizers 820, 825 respectively, and are detected at photocells 850, 855 respectively. Polarizers 820, 825 rotate at the same rate and time, such that the detected light is consistent, and the exact angular orientation of the polarizers 820, 825 can be determined from the two detected signals.

Figure 8B:
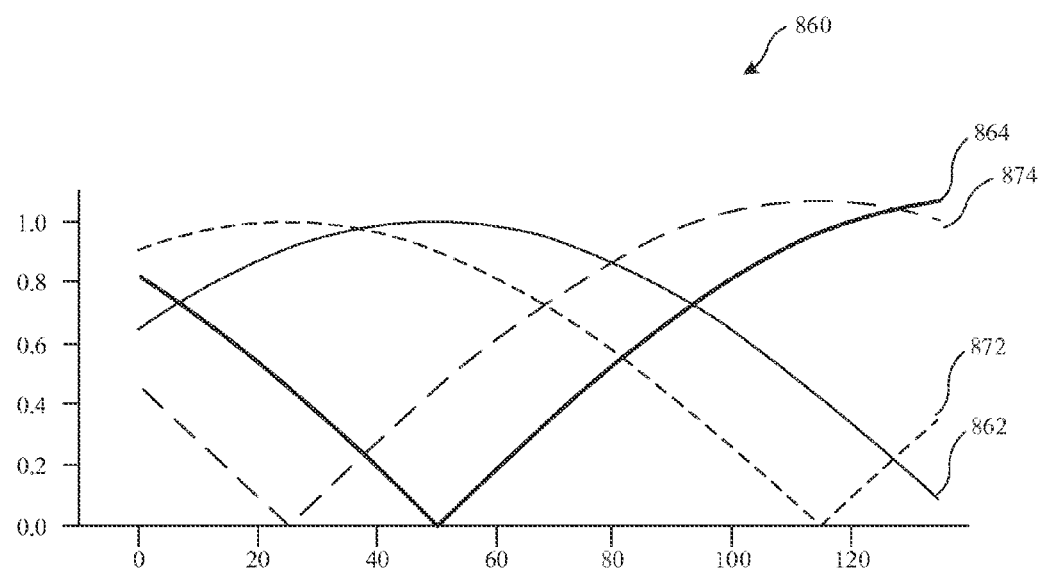
FIG. 8B illustrates a graph of orientation angles and optical intensities for the exemplary polarizer disk and photocells of FIG. 8A according to various embodiments of the present disclosure.

FIG. 8B illustrates a graph of orientation angles and optical intensities for the exemplary polarizer disk and photocells of FIG. 8A. Graph 860 generally depicts the varying values from zero to one (full) over a range of about 130 degrees of rotation, which is the typical range for a laptop lid with respect to a laptop base. Curve 862 represents the strength of signal detected at a first photocell, such as photocell 850, while curve 864 represents the angular sensitivity of the signal detected at the first photocell. As shown, the initial angular orientation of corresponding first polarizer 820 can be about 50 degrees when the laptop upper component angular orientation is about 0 degrees. Curve 872 represents the strength of signal detected at a second photocell, such as photocell 855, while curve 874 represents the angular sensitivity of the signal detected at the second photocell. As shown, the initial angular orientation of corresponding second polarizer 825 can be about 25 degrees when the laptop upper component angular orientation is about 0 degrees and the first polarizer angular orientation is about 50 degrees. The strengths and angular sensitivities detected can then vary as shown. Given the strength of signal detected by both of photocells 850, 855, the angular orientation of the laptop upper component (or other electronic device component) can then be readily determined. Of course, initial angular offsets other than the exemplary 50 and 25 degrees for the polarizers can also be used, as desired.

In various alternative arrangements, an opaque sector can be added to the first polarizer rather than adding a second polarizer. Such an arrangement could act like a single bit disk encoder, with certain ranges not being sensed where the opaque sector comes into play during the rotation of the polarizer. In other embodiments, an LED and polarizer pair can be used instead of a VCSEL, although accuracy may be somewhat compromised. Further optical arrangements may also be used, as will be readily appreciated.

Figure 9:
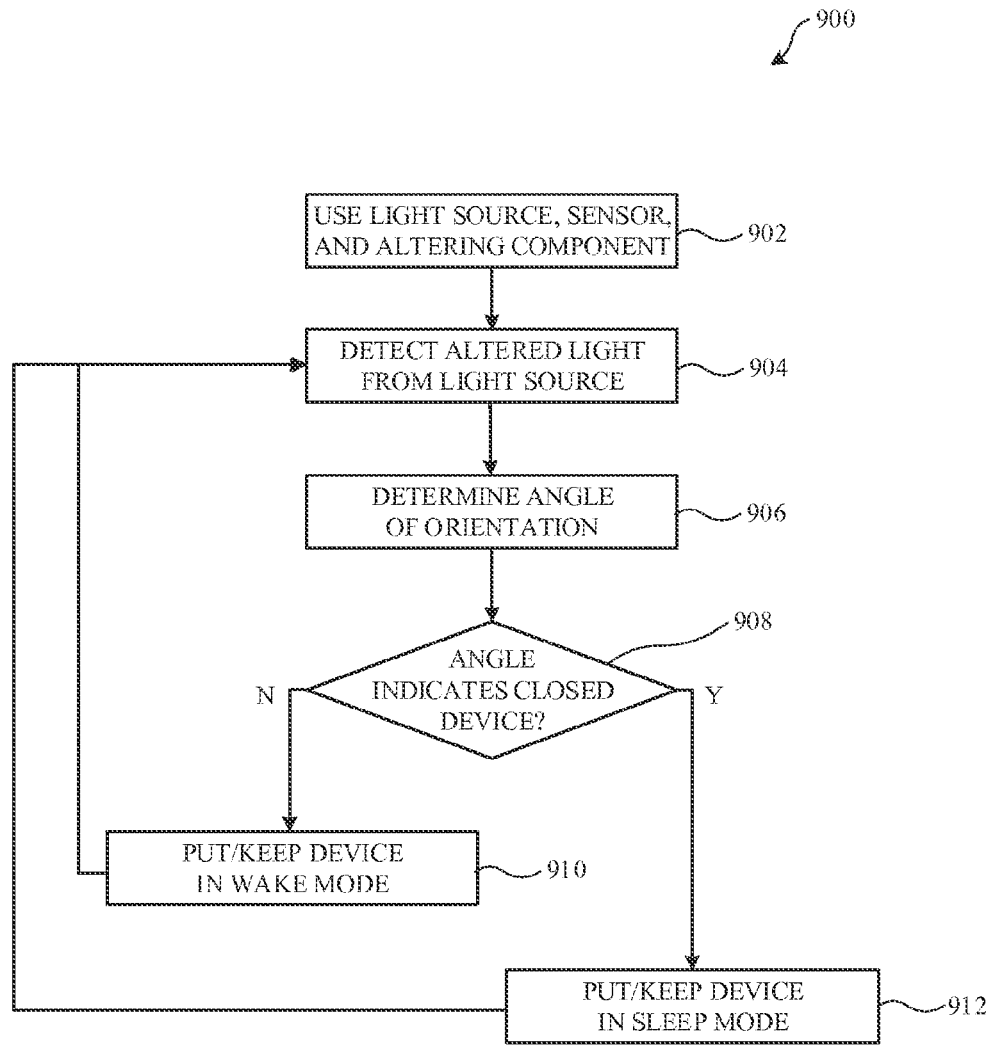
FIG. 9 illustrates a flowchart of an exemplary method for operating a sleep mode system within an electronic device according to various embodiments of the present disclosure.

FIG. 9 illustrates a flowchart of an exemplary method for operating a sleep mode system within an electronic device according to various embodiments of the present disclosure. All or portions of method 900 can be carried out by a processor or other controller that may also be located on the electronic device where the sleep mode system is located. Method 900 can start at a process step 902, where one or more light sources, sensors, and light altering components can be used. Any suitable type, form and arrangement for these components can be implemented, such as the various types, forms, and arrangements set forth in the foregoing illustrative examples. Light sources can include, for example, one or more LEDs or lasers, among other suitable components. Sensors can include, for example, one or more photodiodes or other photo-sensors, among other suitable components. Light altering components can include, for example, one or more encoder disks or polarizers, among other suitable components. Arrangements can include positioning the light altering component(s) between the light source(s) and sensor(s), and can involve any or all of the components being within the electronic device. The light altering component(s) can also be arranged such that light from the light source(s) is altered depending upon the rotational orientation of the light altering component(s), which can correspond to the rotational orientation of different electronic device components, such as in the examples set forth above.

At a following process step 904, altered light from the one or more light sources as altered by the light altering component(s) can be detected, such as by the sensor(s). Altered light or various properties thereof could also be detected at the processor or controller, such as by way of a signal sent from the sensor(s) to the processor or controller. At process step 906, an angle of orientation can be determined based upon the detected altered light. The altered light can reflect an angle of orientation for one or more of the light altering component(s), which angle of orientation can then correspond to an angle of orientation for electronic device components. For example, an angle of orientation of 90 degrees for a light altering component, such as an encoder disk or polarizer, can correspond to an angle of orientation of 90 degrees for an upper component of a laptop computer with respect to the base component of the laptop computer.

At a subsequent decision step 908, an inquiry can be made as to whether the determined angle of orientation indicates that the electronic device is closed. As such, the determined angle can be for a light altering component and/or an upper component of a laptop computer. In various embodiments, set values for whether the electronic device is closed can correspond to an angle of orientation of about 2 degrees or less. Of course, this value can vary as may be desired, such as 0, 1, 3, or 5 degrees or less, among other possible values. If the result is that the determined angle does not indicate a closed electronic device, then the method moves to process step 910, where the device is kept in (or put into) active or wake mode. If the result is that the determined angle does indicate that the device is closed, however, then the method continues to process step 912, where the device is put into (or kept in) sleep mode. After step 910 or 912, the method then reverts to process step 904, and steps 904 through 912 are repeated.

For the foregoing flowchart, it will be readily appreciated that not every step provided is always necessary, and that further steps not set forth herein may also be included. For example, added steps that involve the design of a customized encoder disk or other light altering component(s) may be added. Steps involving setting the angle for a closed device could also be included. Furthermore, the exact order of steps may be altered as desired, and some steps may be performed simultaneously.

Figure 10:
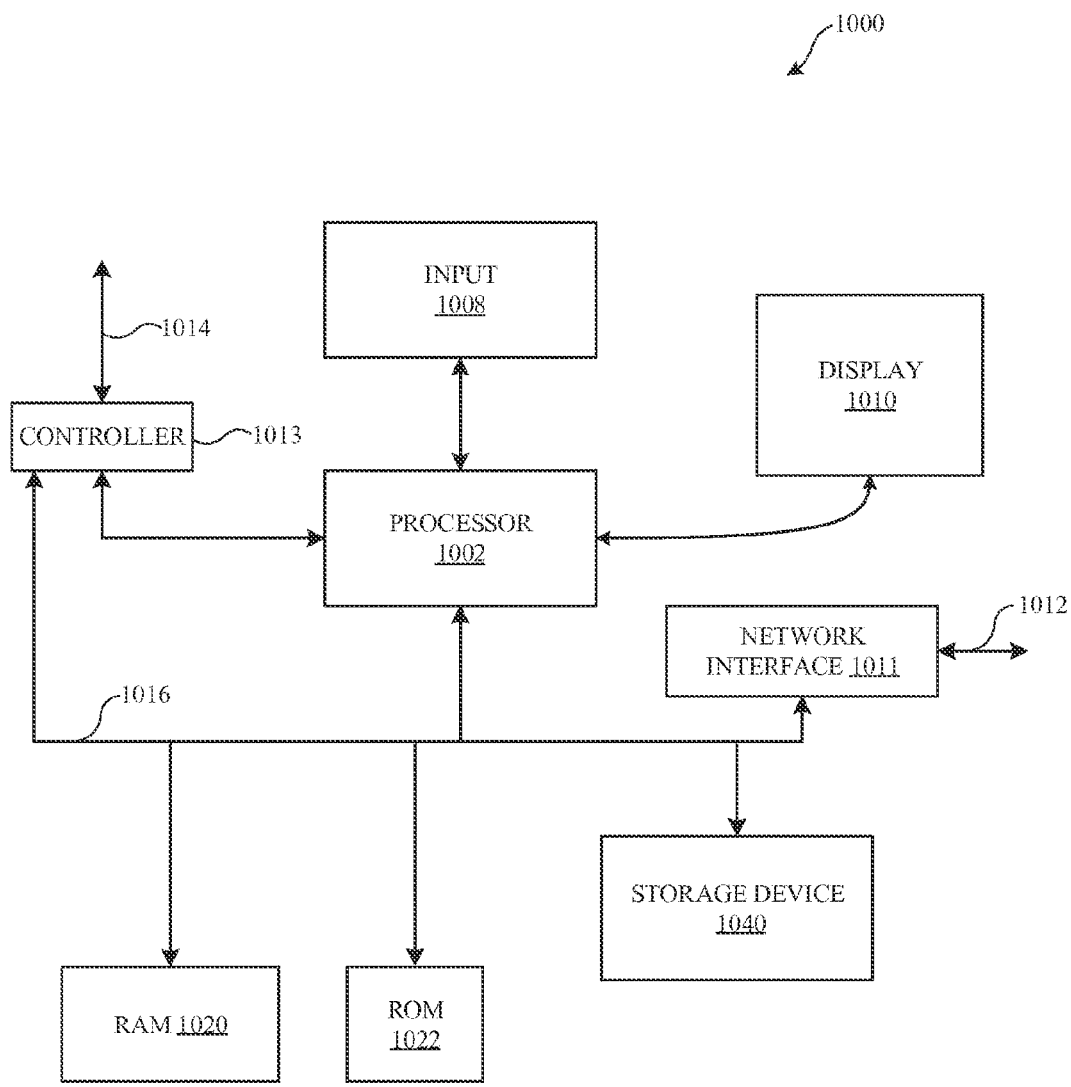
FIG. 10 illustrates in block diagram format an exemplary computing device that can be used to implement the various components and techniques described herein according to various embodiments of the present disclosure.

FIG. 10 illustrates in block diagram format an exemplary computing device 1000 that can be used to implement the various components and techniques described herein, according to some embodiments. In particular, the detailed view illustrates various components that can be included in the electronic device 100 illustrated in FIG. 1. Such components can include a sleep mode system, such as that which is shown in FIG. 5 or FIG. 7, as well as a processor that controls the sleep mode system, such as by way of the method shown in FIG. 9. As shown in FIG. 10, the computing device 1000 can include a processor 1002 that represents a microprocessor or controller for controlling the overall operation of computing device 1000. The computing device 1000 can also include a user input device 1008 that allows a user of the computing device 1000 to interact with the computing device 1000. For example, the user input device 1008 can take a variety of forms, such as a capacitive touch surface as set forth above, as well as a button, keypad, dial, touch screen, audio input interface, visual/image capture input interface, input in the form of other sensor data, etc. Still further, the computing device 1000 can include a display 1010 (screen display) that can be controlled by the processor 1002 to display information to the user (for example, a movie or other AV or media content). A data bus 1016 can facilitate data transfer between at least a storage device 1040, the processor 1002, and a controller 1013. The controller 1013 can be used to interface with and control different equipment through and equipment control bus 1014. Such equipment can include, for example, a sleep mode system and sensors for same, such as that which is disclosed herein. The computing device 1000 can also include a network/bus interface 1011 that couples to a data link 1012. In the case of a wireless connection, the network/bus interface 1011 can include a wireless transceiver.

The computing device 1000 can also include a storage device 1040, which can comprise a single disk or a plurality of disks (e.g., hard drives), and includes a storage management module that manages one or more partitions within the storage device 1040. In some embodiments, storage device 1040 can include flash memory, semiconductor (solid state) memory or the like. The computing device 1000 can also include a Random Access Memory (RAM) 1020 and a Read-Only Memory (ROM) 1022. The ROM 1022 can store programs, utilities or processes to be executed in a non-volatile manner. The RAM 1020 can provide volatile data storage, and stores instructions related to the operation of the computing device 1000.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A hinge assembly for pivotally coupling a first laptop component to a second laptop component, the hinge assembly comprising:
   a first bracket coupled to the first laptop component;
   a second bracket coupled to the second laptop component; and
   an optical arrangement, comprising:
   (i) a light source component;
   (ii) a light sensing component configured to detect light emitted from the light source component; and
   (iii) a light altering component being rotatable with respect to the second laptop component, wherein the light altering component is configured to encode the emitted light with rotational information as the emitted light passes through the light altering component before reaching the light sensing component.

2. The hinge assembly of claim 1, wherein the first laptop component is rotatable with respect to the second laptop component about a rotational axis and the light altering component is disposed between the light source component and the light sensing component such that the light altering component, the light source component, and the light sensing component are aligned along the rotational axis.

3. The hinge assembly of claim 1, wherein the light sensing component is further configured to provide a signal regarding the detected light.

4. The hinge assembly of claim 3, the light sensing component is in communication with a controller and the controller is configured to receive the signal and determine an orientation angle of the light altering component based upon the detected light by decoding the rotational information.

5. The hinge assembly of claim 4, wherein the controller is further configured to put a laptop computer carrying the first and second laptop components into a sleep mode when the determined orientation angle indicates a closed condition for the laptop computer.

6. The hinge assembly of claim 4, wherein the controller is further configured to affect an antenna performance or a thermal performance of a laptop computer carrying the first and second laptop components based upon the determined orientation angle.

7. The hinge assembly of claim 1, wherein the light altering component includes an encoder disk having a plurality of slots that together form a binary code generator.

8. The hinge assembly of claim 7, wherein different rotational positions of the encoder disk result in different binary code readings at the light sensing component.

9. The hinge assembly of claim 7, wherein the light source component includes a plurality of light emitting diodes and the light sensing component comprises a corresponding plurality of photodiodes.

10. The hinge assembly of claim 1, wherein the light altering component includes a first polarizer and the light source component emits polarized light.

11. The hinge assembly of claim 10, wherein different rotational positions of the first polarizer result in different light strength readings at the light sensing component.

12. The hinge assembly of claim 10, wherein the light altering component includes a second polarizer that is rotationally offset from the first polarizer, and wherein the light sensing component includes a first photo-sensor for the first polarizer and a second photo-sensor for the second polarizer.

13. The hinge assembly of claim 1, wherein the optical arrangement is capable of detecting an orientation angle between the first and second laptop components at least from 0 degrees to 180 degrees.

14. An electronic device comprising:
   a first device component;
   a second device component;
   a first bracket coupled to the first device component, the first bracket integrally formed with a clutch barrel;
   a second bracket coupled to the second device component, the second bracket integrally formed with a shaft that is rotationally disposed within the clutch barrel;

a light source coupled to the shaft;

a sensor disposed proximate the light source and configured to detect light emitted therefrom; and a light altering component configured to affect light emitted from the light source, the light altering component being coupled to the first bracket, wherein the light altering component is configured to encode the emitted light with rotational information as the emitted light passes through the light altering component before reaching the sensor.

15. The electronic device of claim 14, wherein the first device component is rotatable with respect to the second device component about a rotational axis, and the light source, the sensor, and the light altering component are aligned along the rotational axis.

16. The electronic device of claim 14, further comprising:

a controller in communication with the sensor and configured to receive a signal therefrom regarding detected light, wherein the controller is further configured to determine an orientation angle of the first device component based upon the detected light.

17. The electronic device of claim 14, wherein the light altering component includes an encoder disk having a plurality of slots that together form a binary code generator.

18. The electronic device of claim 14, wherein the light altering component includes one or more polarizers and the light source emits polarized light.

19. A method for putting an electronic device into a sleep mode, the method comprising:

determining an angle of orientation for a light altering component located within a hinge assembly of the electronic device, the light altering component being between a light source and a sensor, wherein the light altering component is configured to encode light emitted from the light source with rotational information as the emitted light passes through the light altering component before reaching the sensor, and wherein the light altering component is configured to rotate with a rotating portion of the hinge assembly of the electronic device; and putting the electronic device into the sleep mode when the angle of orientation indicates that the electronic device is closed.

20. The method of claim 19, further comprising:

detecting light at the sensor after the light has been affected by the light altering component.

\* \* \* \* \*